(12) United States Patent
DeLuca

(10) Patent No.: US 6,215,471 B1
(45) Date of Patent: Apr. 10, 2001

(54) VISION POINTER METHOD AND APPARATUS

(76) Inventor: Michael Joseph DeLuca, 1104 Claire Ave., Austin, TX (US) 78703

( * ) Notice: Subject to any disclaimer, the term of this patent is extended or adjusted under 35 U.S.C. 154(b) by 0 days.

(21) Appl. No.: 09/067,877

(22) Filed: Apr. 28, 1998

(51) Int. Cl.⁷ ............................................. G09G 5/10
(52) U.S. Cl. .................... 345/158; 345/156; 345/7
(58) Field of Search .................. 345/7, 8, 9, 156, 345/157, 158, 145

(56) References Cited

U.S. PATENT DOCUMENTS

| | | |
|---|---|---|
| 3,987,685 | 10/1976 | Opocensky . |
| 5,012,522 | 4/1991 | Lambert . |
| 5,351,076 | 9/1994 | Hata et al. . |
| 5,367,315 * | 11/1994 | Pan ........................ 345/158 |
| 5,422,640 | 6/1995 | Haley . |
| 5,424,756 | 6/1995 | Ho et al. . |
| 5,455,601 * | 10/1995 | Ozaki ........................ 345/123 |
| 5,561,718 | 10/1996 | Trew et al. . |
| 5,625,380 * | 4/1997 | Hansen ........................ 345/158 |
| 5,629,752 | 5/1997 | Kinjo . |
| 5,680,481 | 10/1997 | Prasad et al. . |
| 5,686,942 * | 11/1997 | Ball ........................ 345/158 |
| 5,715,325 | 2/1998 | Bang et al. . |
| 5,719,951 | 2/1998 | Shackleton et al. . |

* cited by examiner

*Primary Examiner*—Dennis-Doon Chow
(74) *Attorney, Agent, or Firm*—IdeoCo.com

(57) ABSTRACT

A system has an information display and a camera for visually observing an observer of the information display. The information display and camera may be part of personal computer equipped for video conferences. The observer controls movement of a pointer on the information display by changing positions. The pointer may be moved by corresponding rotation or movement of visually identifiable characteristic, such as a facial feature of the observer. The movement of the pointer may be independent of the area of the information display being viewed by the observer. Furthermore, the observer may control the information on the display by modifying a changeable visual characteristic. A closure of a left eye causes generation of a first control signal while closure of a right eye causes generation of a second control signal.

26 Claims, 5 Drawing Sheets

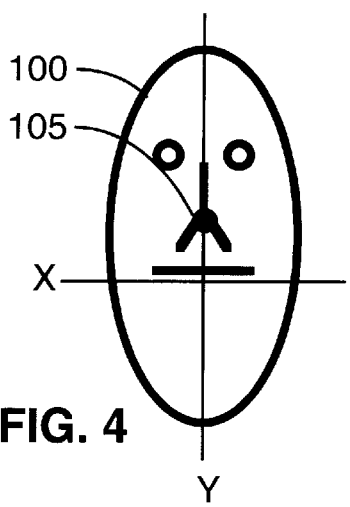
FIG. 4
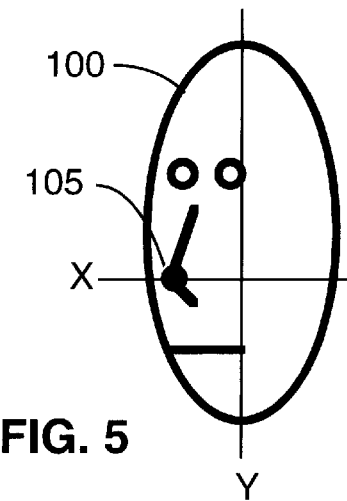 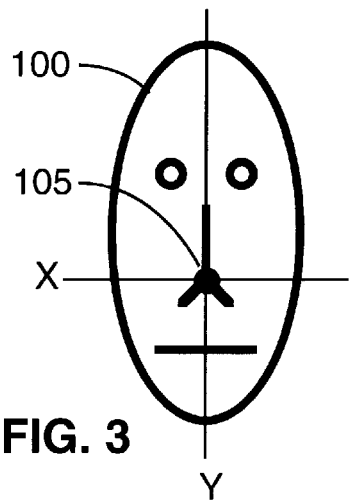 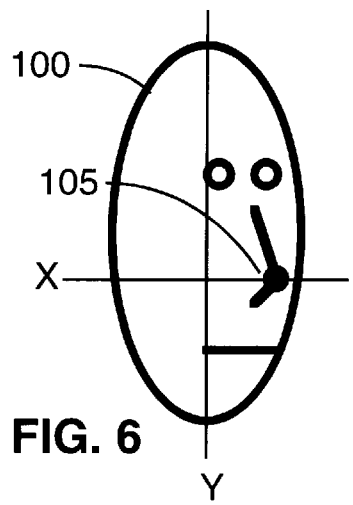
FIG. 5  FIG. 3  FIG. 6
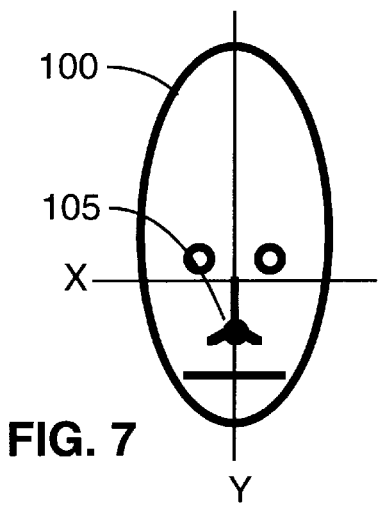
FIG. 7

VISION POINTER METHOD AND APPARATUS

FIELD OF THE INVENTION

This invention generally relates to the area of human input devices for computers and particularly to a vision system for control of a display pointer or cursor.

BACKGROUND OF THE INVENTION

Most popular personal computers have a pointing device as an integral part of their operating system. Such personal computers include those using Microsoft's Windows 95 or Apple's Macintosh operating systems. Various types of pointing devices are in use, and include devices commonly referred to a either a "mouse", "track pad" or "track ball". Such devices are described in U.S. Pat. No. 3,987,685 Oct. 26, 1976 to Opocensky entitled "Cursor position device" and U.S. Pat. No. 5,424,756 Jun. 13, 1995 to Ho et al. entitle "Track pad cursor positioning device and method" and hereby incorporated by reference. Pointing devices are used to move a pointer or cursor across an information display, such as a computer monitor, in response to movements by the observer of the information display. A problem with such pointing devices is that they require use of a user's hands to operate. Often a user cannot handle a key board associated with the personal computer while operating the pointing device. Thus, what is needed is a pointing device which operates independently of the hands of the user.

Video conferencing as becoming a popular application for personal computers. More powerful microprocessors, improved video compression applications, improved modem data rates and lower price video cameras have made video conferencing a more viable option for users of personal computers. Such a system is described in U.S. Pat. No. 5,351,076, Sep. 27, 1994 to Hata et al., entitled "Terminal system having video telephone equipment cooperating with computer system", which is hereby incorporated by reference. As a result, many personal computers have a video camera to enable video conferencing. The video camera is typically directed at the user of the personal computer when the user is engaged in a video conference. The video camera remains directed at the user when the user is observing the information screen and using the personal computer for other computer related applications such a as word processor, spread sheet, computer game or internet navigation. Thus, it is desirable is to provide an additional application for the video camera while the user is observing the computer's information display.

BRIEF DESCRIPTION OF THE DRAWINGS

FIG. 3 through FIG. 7 show images of the head of the observer in various relative positions.

DETAILED DESCRIPTION OF THE INVENTION

Figure 1:
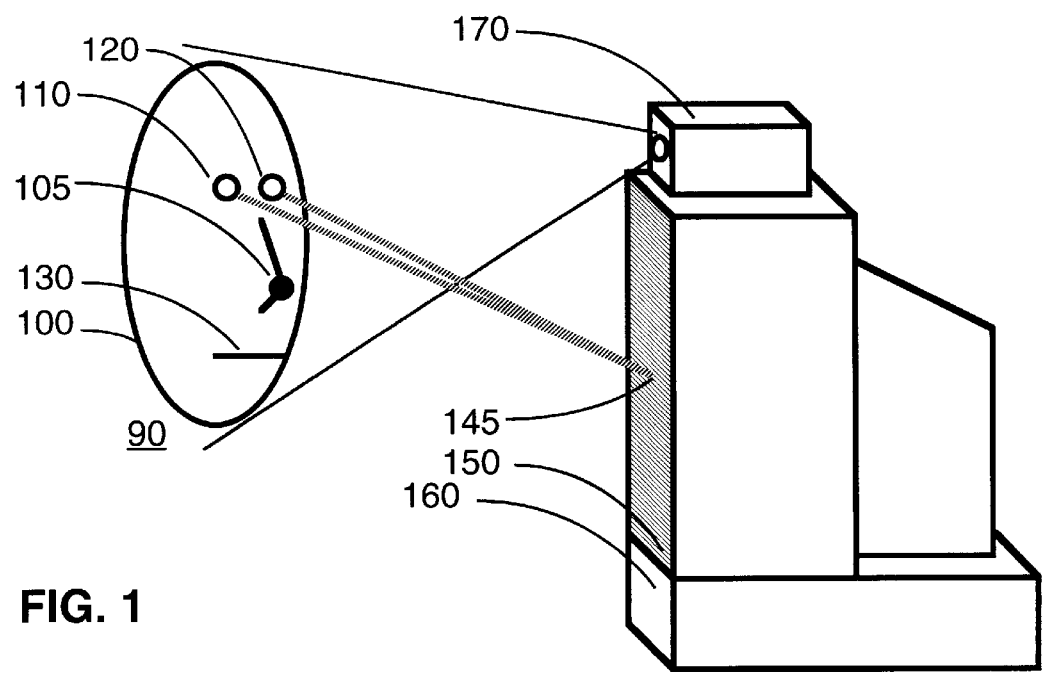
FIG. 1 shows an observer and a vision pointer system having an information display and a video camera.

FIG. 1 shows an observer and a vision pointer system having an information display and a video camera. The observer or computer user 90 has a face with a profile 100. The observer's face has a noise having a tip 105, a right eye 110, a left eye 120 and a mouth 130. The observer is observing an area 145 of an information display 150 coupled to a personal computer 160. Area 145 is indicated by dashed lines from the eyes 110 and 120 of the user 90 to area 145 of the information display 150. Video camera 170 is shown by dashed lines to be capturing an image of observer 90. Video camera 170 captures images of the observer in order to move a pointer on the information display 150, the pointer being similar in use to a pointer on a computer monitor which is moved by a conventional mouse, track ball or track pad. Video camera 170 may further be used for video conferencing in a manner known in the art.

Figure 2:
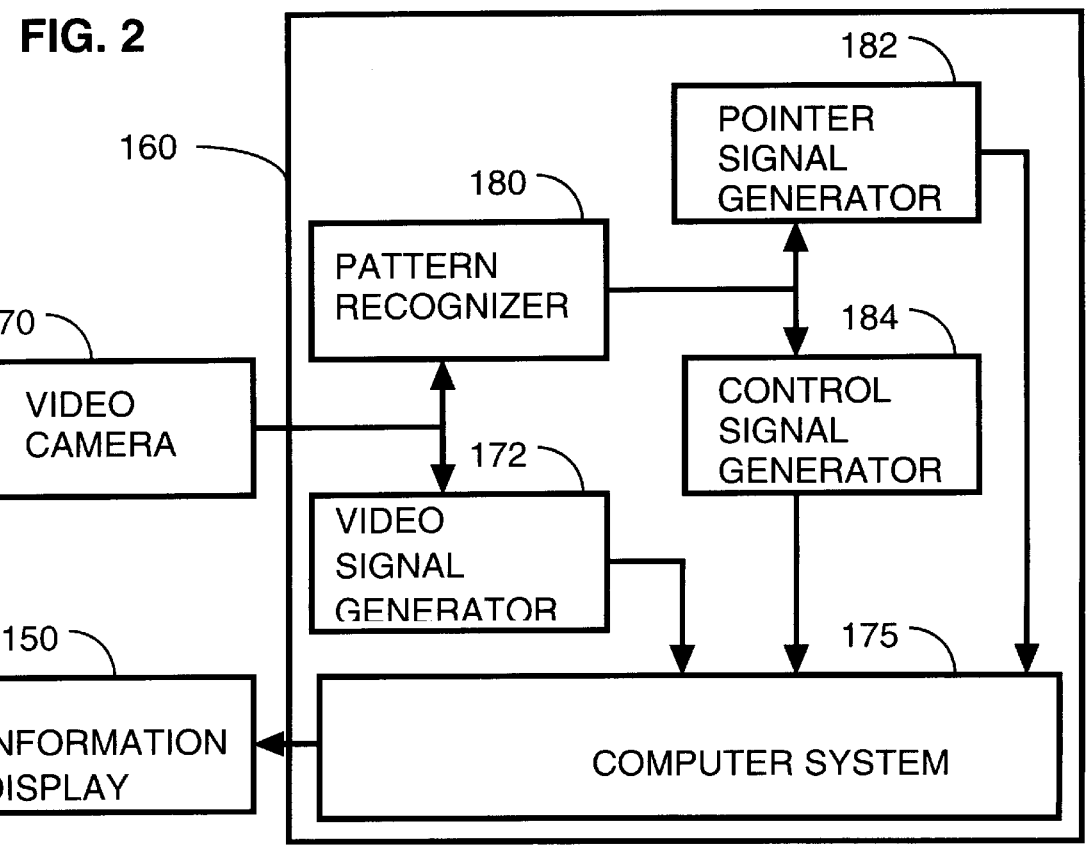
FIG. 2 shows a block diagram of the vision pointer system operating in accordance with the present invention.

FIG. 2 shows a block diagram of the vision pointer system operating in accordance with the present invention. Information display 150 receives signals from the personal computer 160 in order to present images on the information display. The images generated by the personal computer 160 include displays associated with application programs such as word processors, spread sheets, video games, internet pages, digital pictures and video conferences. The personal computer 160 also receives image signals from video camera 170. The image signals are processed by video signal processor 172 to present the image information to computer system 175 for applications such as video conferencing. Computer system 175 includes a microprocessor such as a Intel Pentium or a Motorola PowerPC microprocessor, as well a memory, modem, local area network interface, power supply, circuits and software including operating system and application software to process the video signals from video signal generator 172. Combined with video signal processor 172, the computer system 175 can be used as a video communication means for enabling the user to conduct a video conference using the video camera 170.

The image signals from video camera 170 are also presented to pattern recognizer 180 which processes the image signals. Pattern recognizer 180 operates as a position determining means to determine a position of the observer in response to a visual image of the user and produce a position signal in response thereto. Pattern recognizers capable of determining a position of a user from an image of the user are know. Descriptions of pattern recognizer may be found in at least the following U.S. patents, which are hereby incorporated by reference:

U.S. Pat. No. 5,012,522 Apr. 30, 1991 to Lambert, entitled "Autonomous face recognition machine";

U.S. Pat. No. 5,561,718 Oct. 1, 1996 to Trew et al., entitled "Classifying faces";

U.S. Pat. No. 5,629,752 May 13, 1997 to Kinjo, entitled "Method of determining an exposure amount using optical recognition of facial features";

U.S. Pat. No. 5,680,481 Oct. 21, 1997 to Prasad et al. entitled "Facial feature extraction method and apparatus for a neural network acoustic and visual speech";

U.S. Pat. No. 5,715,325 Feb. 3, 1998 to Bang et al., entitled "Apparatus and method for detecting a face in a video image"; and U.S. Pat. No. 5,719,951 Feb. 17, 1998 to Shackleton et al., entitled "Normalized image feature processing".

Numerous methods of identifying recognizable user characteristics may be employed in determining the position of the user while remaining within the scope of this invention. The position of the pupils of the user's eyes may be used to determine an area on the information display at which the user is looking, such as area 145 of FIG. 1, and the pointer placed in that determined area. Preferably, the relative position of the user's head is used to determine the position of the pointer. For example, if the position signal is generated in response to the user's head rotating to the right then the pointer signal would cause the pointer to correspondingly move to the right. If the head of the user is not rotated, this embodiment has the advantage of allowing the user's head to move up or down or side to side without moving the pointer. In another preferred embodiment, the position of an identifiable visual characteristic of the user may be used to generate the position signal and correspondingly move the pointer. For example, a change in position of the tip of the user's nose may be used to generate the position signal and move the pointer correspondingly. This embodiment has the advantage of enabling pointer movement in response to either rotation of the user's head or movement of the user's head up or down or side to side. Alternately, the position of the user's head may be determined relative to a stationary background. If the user's head moves to side to side and/or up and down relative to the background, then the pointer correspondingly moves to the side to side and/or up and down respectively.

All but the first of the aforementioned methods have the advantage of allowing the user to move the pointer on the information display independent of the area of the information display being observed by the user. These embodiments have the advantage of functionally corresponding to the operation of a conventional mouse who's movements are also independent of their area of the information display being viewed by the user. Thus, a user may view the information display without any distraction of a pointer constantly appearing in the area being viewed. Further, a location on the information display may be viewed, such a portion of a phrase where a word should be inserted, and then the user changes position, by head rotation or movement, to position the pointer at the desired insertion point. A further advantage is that movement of the user's hands is not required to place the pointer.

The position signal from pattern recognizer 180 is applied to pointer signal generator 182 which interprets the position signal to generate a pointer signal. The pointer signal may be proportionally related to the position signal or may have non-linear components. For example, if a user's position changes by a first delta, the pointer signal may cause the pointer to move a second delta proportional to the first delta, and independent of the time taken to produce the first delta. The amount of the proportional change may be adjusted by the user, typically with a control panel setting. Alternately, in a non-linear mode the first delta could produce a third pointer delta less than a fourth pointer delta in response to the first delta occurring in more time for the third pointer delta than for the fourth pointer delta. Such linear and non-linear pointer movements are known in existing mouse, track ball and track pad applications.

Pattern recognizer 180 also processes the image of the observer to recognize changeable visual characteristics of the user and includes the information in the position signal. An example of a changeable visual characteristic of the user is the state of the eyes 110 and 120 of the user, which can be recognized as either open or closed. The pointer signal generator would inhibit movement of the pointer if the changeable visual characteristic of the user was in a predetermined state. For example, the pointer would not move if both eyes of the user were closed and would move if either or both eyes of the user were open. Recognition of the changeable visual characteristics gives the user selective control of enabling and disabling pointer movement in response to the position of the user. Inhibiting pointer movement when both eyes of the user are closed has the further advantage of inhibiting pointer movement when the user is not looking at the information display, eliminating undesirable pointer movements. Additional pointer movements can be inhibited if it is determined that the user is not looking at the display by determining the position of the user's pupils. Furthermore, pointer movements can be inhibited by determining if the distance between the user and the information display is greater than a predetermined amount.

The pattern recognizer 180 also supplies the position signal to control signal generator 184. Control signal generator generates a control signal related to the pointer signal which may function similar to the left mouse and right mouse buttons found on a mouse interfacing to the Windows 95 operating system. These control signals are known to personal computer users and may cause selection of text identified by the pointer, or enable graphical functions of the pointer. The control signal generator monitors the information in the position signal relating to the changeable visual characteristic of the user to generate the control signal. Preferably, a control signal is generated in response to either eye being closed. A left mouse button signal is generated in response to the left eye of the user being closed and a right mouse button signal is generated in response to the right eye of the user being closed. This configuration enables the user to continue observing the information screen while generating control signals, the user's hands remain free. Alternately, other changeable visual characteristics of the user may be used, such an open or closed state of the mouth or a facial expression. Further, a position of the user may be used to generate the control signal such as a tilt of the head. For example, a tilt of the head to the left would activate a left mouse control signal while a tilt of the head to the right would generate the right mouse control signal. The contemplated invention does not preclude the use of hand actuated buttons to perform aforementioned control signal functions in conjunction with the vision pointer.

FIG. 3 through FIG. 7 show images of the head of the observer in various relative positions. The axis labeled "X" and "Y" provide reference coordinates relative to the profile 100 of the observer and are independent of side to side and up/down movement of the observer. FIG. 3 shows the position of the head of the user at an initial referenced position as shown by the intersection of the X and Y axis located at the tip of the user's nose 105. FIG. 4 shows the position of the head of the observer rotated in an upward direction relative to FIG. 3. The rotation being indicated by the tip of the user's nose 105 being located above the intersection of the X and Y axis. The rotation of FIG. 4 causes generation of a pointer signal causing the pointer to move up. FIG. 5 shows the position of the head of the observer rotated to the observer's right relative to FIG. 3, the rotation being indicated by the tip of the user's nose 105 being located to the observer's right of the intersection of the X and Y axis. The rotation of FIG. 5 causes generation of a pointer signal causing the pointer to move to the observer's right. FIG. 6 shows the position of the head of the observer rotated in a left direction relative to FIG. 3, the rotation being indicated by the tip of the user's nose 105 being located to the observer's left of the intersection of the X and Y axis. The rotation of FIG. 6 causes generation of a pointer signal causing the pointer to move to the left. FIG. 7 shows the position of the head of the observer rotated in a downward direction relative to FIG. 3, the rotation being indicated by the tip of the user's nose 105 being located below the intersection of the X and Y axis. The rotation of FIG. 7 causes generation of a pointer signal causing the pointer to move down.

In FIG. 3 through FIG. 7, the pattern recognizer is an image processor which determines a position of the first identifiable visual characteristic, the user's face or profile 100, relative to the position of the second identifiable visual characteristic, the tip of the user's nose 105, and produces the position signal in response thereto. The pointer is then moved side to side or up and down corresponding to the relative position of the two identifiable visual characteristics.

Figure 9:
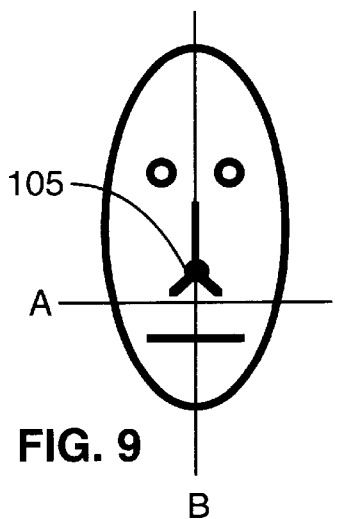
FIG. 9 through FIG. 12 show images of the position of the observer in various positions relative to the initial position of FIG. 8.
Figure 10:
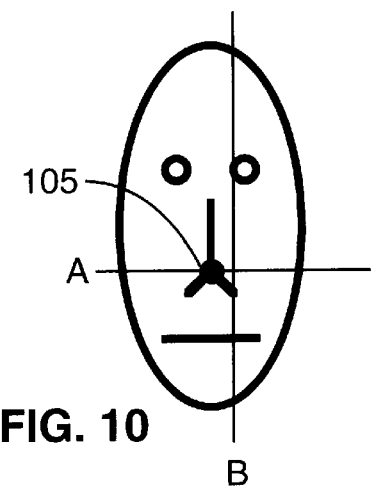
Figure 8:
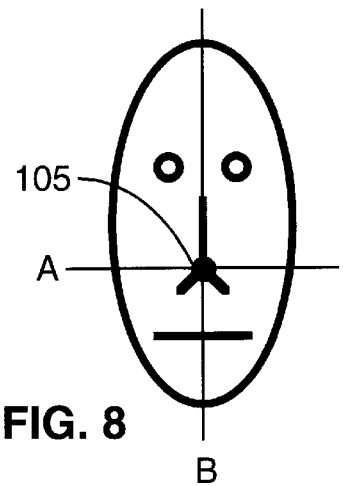
FIG. 8 shows an image of the observer in an initial position.
Figure 11:
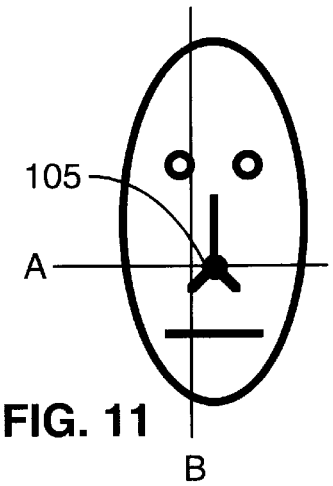
Figure 12:
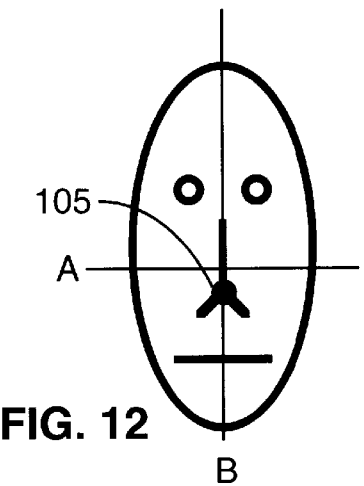

FIG. 9 through FIG. 12 show images of the position of the observer in various positions relative to an initial position of FIG. 8. FIG. 8 shows the position of the head of the user at an initial referenced time as shown by the intersection of the A and B axis located at the tip of the user's nose 105. FIG. 9 shows the position of the observer moving in an upward direction relative to FIG. 8, the movement being indicated by the tip of the user's nose 105 being located above the intersection of the A and B axis. The movement of FIG. 9 causes generation of a pointer signal causing the pointer to move up. FIG. 10 shows the position of the head of the observer moving to the observer's right relative to FIG. 8, the movement being indicated by the tip of the user's nose 105 being located to the observer's right of the intersection of the A and B axis. The movement of FIG. 10 causes generation of a pointer signal causing the pointer to move to the observer's right. FIG. 11 shows the position of the head of the observer moving in a left direction relative to FIG. 8, the movement being indicated by the tip of the observer's nose 105 being located to the left of the intersection of the A and B axis. The movement of FIG. 11 causes generation of a pointer signal causing the pointer to move to the observer's left. FIG. 12 shows the position of the head of the observer moving in an downward direction relative to FIG. 8, the movement being indicated by the tip of the user's nose 105 being located below the intersection of the A and B axis. The movement of FIG. 12 causes generation of a pointer signal causing the pointer to move down.

It should be appreciated that the pointer movements which result from the observer movements of FIG. 8 through FIG. 12 would also result from the rotations of FIG. 3 through FIG. 7, assuming the user is not moving side to side or up and down, because the tip of the observer's nose 105 correspondingly moves when the head of the user is rotated. Preferably, pattern recognizer 180 identifies the tip of the observer's nose as the identifiable visual characteristic. However, it should be further noted that the tip of the user's nose need not be used, other identifiable visual characteristics of the observer may be used including the change in positions of the eyes, mouth or hair or the movement of the head of the user relative to a stationary background.

The movement of the pointer FIG. 3 through FIG. 12 has been described in terms relative to an initial reference position. It should be appreciated that an absolute position method could also be used. For example, the user position of FIG. 3 would cause the pointer to be in the center of the information display. While the position of FIG. 4 would cause the pointer to be at the top center of the information display. As the user's head rotated up from the position of FIG. 3 to the position of FIG. 4, the pointer would correspondingly move from the center of the information display to the top center of the information display. Similar right, left and down pointer movements would correspond to FIG. 5, FIG. 6, and FIG. 7 respectively. A similar absolute positioning can be done with FIG. 8 through FIG. 12 where the intersection of axis A and axis B are an absolute location relative to the viewing area of the video camera. Thus, the observer position of FIG. 8 would cause the pointer to be in the center of the information display. While the position of FIG. 9 would cause the pointer to be at the top center of the information display. As the position of the tip of the user's nose moved up from the position of FIG. 8 to the position of FIG. 9, the pointer would correspondingly move from the center of the information display to the top center of the information display. Similar right, left and down pointer movements would correspond to FIG. 10, FIG. 11, and FIG. 12 respectively. It should also be appreciated that left-right movements or rotations of the proceeding figures can be combined with up-down movements or rotations of the proceeding figures to enable moving of a pointer to any location on the information display.

Figure 14:
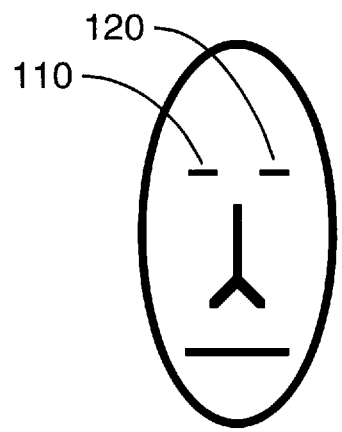
FIG. 13 through FIG. 16 show changeable visual characteristics of the user.
Figure 15:
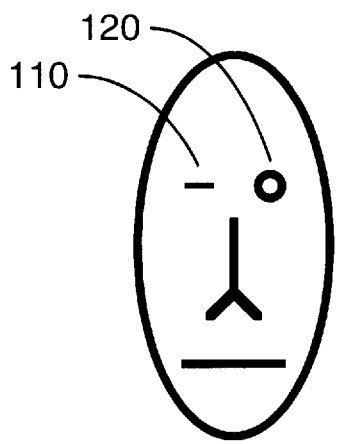
Figure 13:
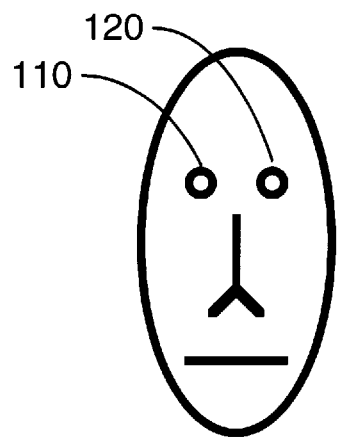
Figure 16:
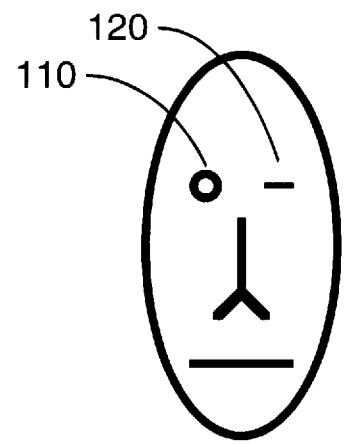

FIG. 13 through FIG. 16 show changeable visual characteristics of the user. In FIG. 13 the both eyes 110 and 120 of the observer are open in which case the aforementioned pointer movements in response to the position of the observer would occur. FIG. 14 shows the user having a changeable visual characteristic where both eyes 110 and 120 are closed. In the preferred embodiment, this would inhibit generation of pointer signal, causing the pointer to be stable even if the position of the user changes. FIG. 15 shows the user having a changeable visual characteristic where the right eye 110 is closed and the left eye 120 is open. In the preferred embodiment, the pointer signal would be generated in response to the position of the user and generation of a control signal corresponding to a right mouse button signal. FIG. 16 shows the user having a changeable visual characteristic where the left eye 120 is closed and the right eye 110 is open. In the preferred embodiment, this would cause the pointer signal would be generated in response to the position of the user and generation of a control signal corresponding to a left mouse button signal.

FIG. 13 through FIG. 16 show the operation of a display control device for controlling information on an information display observed by a user. The image processor or pattern generator 180 coupled to the video camera 170 which captures an image of the user having at least one changeable visual characteristic capable of changing between a first visually identifiable state and at least a second visually identifiable state. The image processor determines the changeable visual characteristic as being in either the first or second state. The control signal generator 184 is coupled to the image processor 180 and generates an information control signal in response to the first but not the second state. The first state corresponds to one of the two eyes being open and the other of the two eyes is closed. The second state corresponds to both eyes being open or both eyes being closed. The control signal includes a first control signal for controlling a first type of display control, such as a right mouse button press, in response to only the right eye being closed and the left eye being open, and the control signal further includes a second control signal for controlling a second type of display control different from the first type of display control, such as a left mouse button press, in response to the left eye being closed and the right eye being open.

Figure 17:
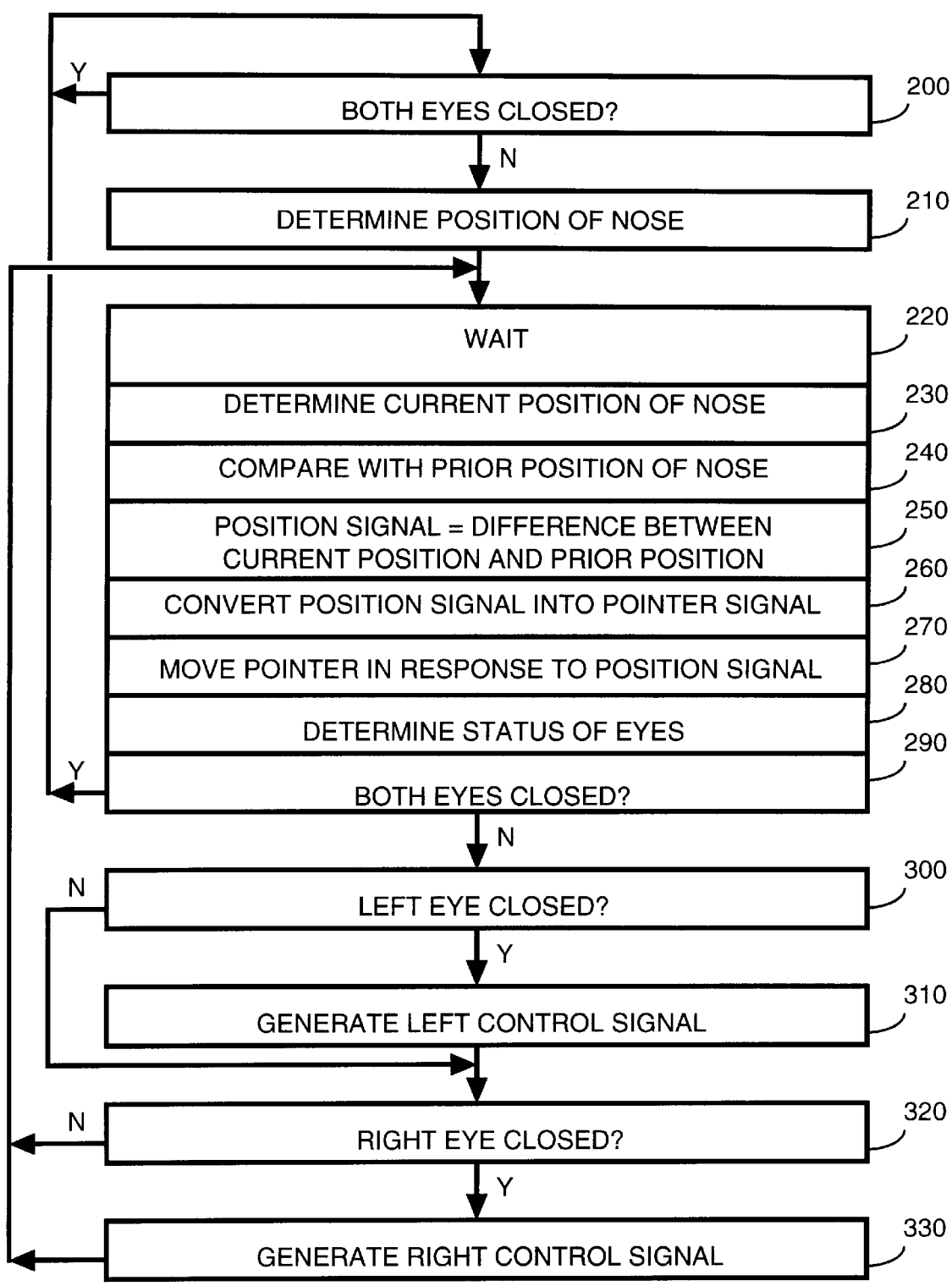
FIG. 17 shows a flowchart of a vision pointer method operating in accordance with the present invention.

FIG. 17 shows a flowchart of a vision pointer method operating in accordance with the present invention. The flowchart of FIG. 17 corresponds to the observer positions referenced in the description accompanying FIG. 8 through FIG. 12. Step 200 checks if both eyes are closed, and if not proceeds to step 210 to determine the position of the nose of the user. Then a predetermined delay is executed at step 220 which is preferably 0.1 seconds. Step 230 determines the current position of the nose using the aforementioned pattern recognition. Step 240 compares the current position of the nose with the prior position of the nose. Step 250 determines the position signal to be the difference between the current position of the nose and the prior position of the nose. Step 260 converts the position signal into the pointer control signal as previously described, and the pointer is moved at step 270. The status of the eyes is determined in step 280 using the aforementioned pattern recognition. Step 290 checks if both eyes are closed, and if true returns to step 200. Otherwise step 290 proceeds to step 300 to check if the left eye is closed, if true step 310 generates a control signal equivalent to the left mouse button signal. Step 320 checks if the right eye is closed, and if true step 330 generates a control signal equivalent to the right mouse button signal. Thereafter the method returns to step 220 to wait and begin another sequence of pointer movement and control signal generation. The flow chart of FIG. 17 preferably operates substantially in software operating within the microprocessor of the personal computer. The determinations of steps 210, 230 and 280 are performed by the aforementioned pattern recognizer 180 of FIG. 2. Alternately, determining the position of the nose can be simplified by placing an easily identifiable marker, such as a blue dot, on the nose which can be readily identified by a video processor. The identifiable marker could also be placed elsewhere to enable determination of the position of the observer, such as a marker incorporated into glasses or other article worn by the user.

It should be further appreciated that for computers with a single mouse buttons, such as the Macintosh, either eye being closed could be used to generate a control signal corresponding to the single mouse button signal. Also, one of the control signals could correspond to another function commonly associated with a computer key board such as a back space, shift or delete function.

Thus, what has been provided is a pointing device which operates independently of the the hands of the user and an additional application for the video camera while the user is observing the information display. Further, the invention can be used in conjunction with a voice recognition system to substantially replace the conventional computer input means of a key board and a mouse. This new combination results in a new but familiar user input means. The user would no longer need to physically touch a computer, the new interface results from vision and sound inputs from the user. However, the familiar functionality of the conventional mouse is substantially similar to the functionality of the vision pointer described herein and the familiar functionality of the conventional keyboard is substantially similar to the functionality of the voice recognition system.

I claim:

1. A pointing device for pointing to a location on an information display observed by a user observing the information display, the pointing device comprising:

a position determiner for determining a position of the user in response to a visual image of the user and for producing a position signal in response thereto, wherein the user has an at least first and second identifiable visual characteristics and said position determining means comprises an image processor for determining a position of the first identifiable visual characteristic relative to a position of the second identifiable visual characteristic and for producing the position signal in response thereto; and a pointer signal generator for providing a pointer signal for moving a pointer on the information display in response to the position signal.

2. The pointing device according to claim 1 wherein the user further has at least one changeable visual characteristic capable of changing between a first visually identifiable state and at least a second visually identifiable state included in the visual image wherein said image processor determines the changeable visual characteristic as being in either the first or second state, and further wherein the position signal is generated in response to determination of the first state and inhibited in response to determination of the second state.

3. The pointing device according to claim 2 wherein the user has at least one eye capable of being opened or closed and the changeable visual characteristic corresponds to the at least one eye, and the first state corresponds to the at least one eye being opened and the second state corresponds to the at least one eye being closed.

4. The pointing device according to claim 2 wherein the user has two eyes, each eye capable of being opened or closed, and the changeable visual characteristic corresponds to the two eyes, and the first state corresponds to at least one of the two eyes being opened and the second state corresponds to both eyes being closed, and further wherein a third state corresponds to one eye being opened and the other eye being closed and said image processor further determines the state of the changeable visual characteristic and the pointing device further comprises a control signal generator for generating a control signal in response to the third state for controlling information on the information display.

5. The pointing device according to claim 1 wherein the user has a face having a nose and the first identifiable visual characteristic corresponds to the face and the second identifiable visual characteristic corresponds to the nose wherein said image processor produces the position signal comprising an up signal when the nose of the user is positioned upward relative to the face, a down signal when the nose of the user is positioned downward relative to the face, a left signal when the nose of the user is positioned towards a left side relative to the face, and a right signal when the nose of the user is positioned towards a right side relative to the face, and whereby the pointer moves up, down, left, and/or right in response to the position signal having a corresponding up, down, left and/or right signal.

6. The pointing device according to claim 1 wherein said pointer signal moves the cursor to an absolute position on the information display in response to the determined position of the first identifiable characteristic relative to the position of the second identifiable visual characteristic by said image processor.

7. The pointing device according to claim 1 included within a computer system, the computer system further comprising voice recognizer for processing voice inputs from the user and adapted to operate in conjunction with said pointing device to provide a user interface responsive to visual and sound inputs from the user.

8. A display control device for controlling information on an information display observed by a user, the display control device comprising:
   an image processor coupled to a video camera for capturing an image of the user having at least one changeable visual characteristic capable of changing between a first visually identifiable state and at least a second visually identifiable state, said image processor for determining the changeable visual characteristic as being in either the first or second state; and
   a control signal generator coupled to said image processor for generating an information control signal in response to the first state, wherein the changeable visual characteristic is substantially independent of a direction of movement of the user and the information control signal controls information presented on the information display and further wherein the user has two eyes and the changeable visual characteristic corresponds to the two eyes, and the first state corresponds to one of the two eyes being open and the second state corresponds to both eves being open or both eves being closed.

9. The display control device according to claim 8 further comprising:
   a position determining means coupled to the video camera for determining a position of the user in response to the image of the user and for producing a position signal in response thereto; and
   a pointer signal generator means for providing a pointer signal for moving a pointer on the information display in response to the position signal.

10. The display control device according to claim 9 wherein the image of the user is further capable of a third visually identifiable state wherein
   said image processor further determines the visual characteristic as having the third state and producing the information control signal in response thereto; and
   said position determining means is responsive to said image processor for inhibiting changes in the position signal in response to the third state.

11. The display control device according to claim 10 wherein the user has two eyes and the third state of changeable visual characteristic corresponds to the two eyes being closed.

12. The display control device according to claim 8 included within a computer system, the computer system further comprising
   voice recognizer for processing voice inputs from the user and adapted to operate in conjunction with said display control device to provide a user interface responsive to visual and sound inputs from the user.

13. The display control device according to claim 8 wherein the two eyes of the user include a left eye and a right eye and the information control signal includes a first control signal in response to only the right eye being closed and the left eye being open, and a second control signal different from the first control signal in response to the left eye being closed and the right eye being open.

14. A pointing device for pointing to a location on an information display observed by a user having at least one changeable visual characteristic capable of changing between a first visually identifiable state and at least a second visually identifiable state, the pointing device comprising:
   a position determiner for determining a position of the user in response to a visual image of the user and for producing a position signal in response thereto; and having
   an image processor responsive to the visual image for producing the position signal and for determining the changeable visual characteristic of the visual image as being in either the first or second state, wherein the position signal is generated in response to determination of the first state and inhibited in response to determination of the second state; and
   a pointer signal generator means for providing a pointer signal for moving a pointer on the information display in response to the position signal, wherein the user has two eyes, each eye capable of being opened or closed, and the changeable visual characteristic corresponds to the two eyes, and the first state corresponds to at least one of the two eyes being opened and the second state corresponds to both eyes being closed, and further wherein a third state corresponds to one eye being opened and the other eye being closed and
   said image processor further determines the third state of the changeable visual characteristic and the pointing device further comprises
   a control signal generator for generating a control signal in response to the third state for controlling information on the information display.

15. The pointing device according to claim 14 wherein the user has an at least first and second identifiable visual characteristics and said position determiner comprises
   an image processor for determining a position of the first identifiable visual characteristic relative to a position of the second identifiable visual characteristic and for producing the position signal in response thereto.

16. The pointing device according to claim 15 wherein the user has a face having a nose and the first identifiable visual characteristic corresponds to the face and the second identifiable visual characteristic corresponds to the nose wherein
   said image processor produces the position signal comprising
   an up signal when the nose of the user is positioned upward relative to the face,
   a down signal when the nose of the user is positioned downward relative to the face,
   a left signal when the nose of the user is positioned towards a left side relative to the face, and
   a right signal when the nose of the user is positioned towards a right side relative to the face, and whereby the pointer moves up, down, left, and/or right in response to the position signal having a corresponding up, down, left and/or right signal.

17. The pointing device according to claim 14 included within a computer system, the computer system further comprising
   voice recognition means for processing voice inputs from the user and adapted to operate in conjunction with said pointing device to provide a user interface responsive to visual and sound inputs from the user.

18. A display control device for controlling information on an information display observed by a user, the display control device comprising:
   an image processor coupled to a video camera for capturing an image of the user having at least one changeable visual characteristic capable of changing between a first visually identifiable state and at least a second visually identifiable state, said image processor for determining the changeable visual characteristic as being in either the first or second state;
   a control signal generator coupled to said image processor for generating an information control signal in response to the first state, whereby the information control signal controls information presented on the information display;

a position determiner coupled to the video camera for determining a position of the user in response to the image of the user and for producing a position signal in response thereto; and a pointer signal generator means for providing a pointer signal for moving a pointer on the information display in response to the position signal, wherein the image of the user is further capable of a third visually identifiable state wherein said image processor further determines the visual characteristic as having the third state and producing the information control signal in response thereto; and said position determining means is responsive to said image processor for inhibiting changes in the position signal in response to the third state.

19. The display control device according to claim 18 wherein the user has two eyes and the third state of changeable visual characteristic corresponds to the two eyes being closed.

20. The display control device according to claim 18 wherein the user has two eyes and the changeable visual characteristic corresponds to the two eyes, and the first state corresponds to one of the two eyes being open and the second state corresponds to both eyes being open or both eyes being closed.

21. The display control device according to claim 20 wherein the two eyes of the user include a left eye and a right eye and the information control signal includes a first control signal in response to only the right eye being closed and the left eye being open, and a second control signal different from the first control signal in response to the left eye being closed and the right eye being open.

22. The display control device according to claim 18 included within a computer system, the computer system further comprising voice recognizer for processing voice inputs from the user and adapted to operate in conjunction with said display control device to provide a user interface responsive to visual and sound inputs from the user.

23. A pointing device for pointing to a location on an information display observed by a user having at least one changeable visual characteristic capable of changing between a first visually identifiable state and at least a second visually identifiable state, the pointing device comprising:

a position determining means for determining a position of the user in response to a visual image of the user and for producing a position signal in response thereto; and having an image processor responsive to the visual image for producing the position signal and for determining the changeable visual characteristic of the visual image as being in either the first or second state, wherein the position signal is generated in response to determination of the first state and inhibited in response to determination of the second state; and a pointer signal generator means for providing a pointer signal for moving a pointer on the information display in response to the position signal, wherein the user has an at least first and second identifiable visual characteristics and said position determining means comprises an image processor for determining a position of the first identifiable visual characteristic relative to a position of the second identifiable visual characteristic and for producing the position signal in response thereto and further wherein the user has a face having a nose and the first identifiable visual characteristic corresponds to the face and the second identifiable visual characteristic corresponds to the nose wherein said image processor produces the position signal comprising an up signal when the nose of the user is positioned upward relative to the face, a down signal when the nose of the user is positioned downward relative to the face, a left signal when the nose of the user is positioned towards a left side relative to the face, and a right signal when the nose of the user is positioned towards a right side relative to the face, and whereby the pointer moves up, down, left, and/or right in response to the position signal having a corresponding up, down, left and/or right signal.

24. The pointing device according to claim 23 wherein the user has at least one eye capable of being opened or closed and the changeable visual characteristic corresponds to the at least one eye, and the first state corresponds to the at least one eye being opened and the second state corresponds to the at least one eye being closed.

25. The pointing device according to claim 23 wherein the user has two eyes, each eye capable of being opened or closed, and the changeable visual characteristic corresponds to the two eyes, and the first state corresponds to at least one of the two eyes being opened and the second state corresponds to both eyes being closed, and further wherein a third state corresponds to one eye being opened and the other eye being closed and said image processor further determines the third state of the changeable visual characteristic and the pointing device further comprises a control signal generator for generating a control signal in response to the third state for controlling information on the information display.

26. The pointing device according to claim 23 included within a computer system, the computer system further comprising voice recognizer for processing voice inputs from the user and adapted to operate in conjunction with said pointing device to provide a user interface responsive to visual and sound inputs from the user.

* * * * *